(12) United States Patent
Iorga et al.

(10) Patent No.: US 12,231,317 B2
(45) Date of Patent: Feb. 18, 2025

(54) IN-BAND TELEMETRY RATE LIMITING IN CLOUD ENVIRONMENTS

(71) Applicant: Lenovo Global Technology (United States) Inc., Morrisville, NC (US)

(72) Inventors: Radu Mihai Iorga, Bucharest (RO); Corneliu-Ilie Calciu, Bucharest (RO); Roberto H. Jacob Da Silva, Oak Park, CA (US); George-Andrei Stanescu, Ilfov (RO)

(73) Assignee: Lenovo Global Technology (United States) Inc., Morrisville, NC (US)

( * ) Notice: Subject to any disclaimer, the term of this patent is extended or adjusted under 35 U.S.C. 154(b) by 435 days.

(21) Appl. No.: 17/667,401

(22) Filed: Feb. 8, 2022

(65) Prior Publication Data
US 2023/0254232 A1 Aug. 10, 2023

(51) Int. Cl.
*H04L 43/0864* (2022.01)
*H04L 43/16* (2022.01)

(52) U.S. Cl.
CPC .......... *H04L 43/0864* (2013.01); *H04L 43/16* (2013.01)

(58) Field of Classification Search
CPC .................... H04L 43/0864; H04L 43/16
See application file for complete search history.

(56) References Cited

U.S. PATENT DOCUMENTS

| | | | |
|---|---|---|---|
| 11,968,548 B1* | 4/2024 | Levensalor | H04L 41/0823 |
| 2022/0014478 A1* | 1/2022 | Lee | H04L 47/781 |
| 2022/0311691 A1* | 9/2022 | Biradar | G06F 16/2255 |
| 2022/0337497 A1* | 10/2022 | Huang | H04L 47/10 |
| 2023/0300051 A1* | 9/2023 | Song | H04L 41/04 370/252 |

* cited by examiner

*Primary Examiner* — Ricky Q Ngo
*Assistant Examiner* — Stephen N Steiner
(74) *Attorney, Agent, or Firm* — Kunzler Bean & Adamson; Bruce R. Needham

(57) ABSTRACT

A method for in-band telemetry rate limiting is disclosed. An apparatus and computer program product also perform the functions of the method. Embodiments of the method include receiving a telemetry packet at an egress node of a data pathway in a data network. The data pathway includes an ingress node, transit nodes and the egress node and the telemetry packet includes a telemetry parameter where the telemetry parameter is for a node in the data pathway. The method includes comparing the telemetry parameter with a previous telemetry parameter from a previous telemetry packet received at the egress node prior to receiving the telemetry packet, and transmitting telemetry data from the telemetry packet to a network controller in response to a telemetry difference exceeding a telemetry parameter threshold. The telemetry difference includes a difference between the telemetry parameter and the previous telemetry parameter.

17 Claims, 7 Drawing Sheets

IN-BAND TELEMETRY RATE LIMITING IN CLOUD ENVIRONMENTS

FIELD

The subject matter disclosed herein relates to in-band telemetry and more particularly relates to in-band telemetry rate limiting.

BACKGROUND

Measuring network performances in cloud heterogenous environments becomes that much more complicated since there are several actors involved, both software (hypervisors, virtual network devices) and hardware (switches, routers, firewalls).

One of the most important network parameters is the latency and output queue congestion level, which can be measured in both virtual and physical networks using in-band network telemetry ("IBT"). From a very high level, the functionality of IBT implies sampling and copying actual data traffic, adding metadata to copies of the original packets and sending the packet copies through the exact same data pathway as the original data packet.

Metadata gathered using IBT often includes latency and output queue congestion level information from inside each node (software or hardware). At an egress node, which is the last node along a data pathway of a data packet, the data packet is processed and the data packet's metadata sent to a network controller for analysis. This network controller is typically external to the data network under observation and works in a centralized fashion i.e., aggregating telemetry information from all network devices within the data network.

IBT often uses copies of production traffic packets to create a telemetry packet, or adds a telemetry header to a data packet. Often there can be a lot of metadata collected that needs to be sent to the network controller. The network controller may be overwhelmed with telemetry metadata as the number of monitored network devices as well as traffic flowing in the network increases. Furthermore, if the data pathway of the telemetry packet or data packet is long, the telemetry metadata can become large in size, increasing an analysis load on the network controller.

BRIEF SUMMARY

A method for in-band telemetry rate limiting is disclosed. An apparatus and computer program product also perform the functions of the method. Embodiments of the method include receiving a telemetry packet at an egress node of a data pathway in a data network. The data pathway includes an ingress node, transit nodes and the egress node and the telemetry packet includes a telemetry parameter where the telemetry parameter is for a node in the data pathway. The method includes comparing the telemetry parameter with a previous telemetry parameter from a previous telemetry packet received at the egress node prior to receiving the telemetry packet, and transmitting telemetry data from the telemetry packet to a network controller in response to a telemetry difference exceeding a telemetry parameter threshold. The telemetry difference includes a difference between the telemetry parameter and the previous telemetry parameter.

An apparatus for in-band telemetry rate limiting includes a processor and a memory storing code. The code is executable by the processor to perform operations that include receiving a telemetry packet at an egress node of a data pathway in a data network. The data pathway includes an ingress node, transit nodes and the egress node and the telemetry packet includes a telemetry parameter where the telemetry parameter is for a node in the data pathway. The code is executable by the processor to perform operations that include comparing the telemetry parameter with a previous telemetry parameter from a previous telemetry packet received at the egress node prior to receiving the telemetry packet, and transmitting telemetry data from the telemetry packet to a network controller in response to a telemetry difference exceeding a telemetry parameter threshold. The telemetry difference includes a difference between the telemetry parameter and the previous telemetry parameter.

A program product for in-band telemetry rate limiting includes a non-volatile computer readable storage medium storing code. The code is configured to be executable by a processor to perform operations that include receiving a telemetry packet at an egress node of a data pathway in a data network. The data pathway includes an ingress node, transit nodes and the egress node and the telemetry packet includes a telemetry parameter where the telemetry parameter is for a node in the data pathway. The code is configured to be executable by a processor to perform operations that include comparing the telemetry parameter with a previous telemetry parameter from a previous telemetry packet received at the egress node prior to receiving the telemetry packet, and transmitting telemetry data from the telemetry packet to a network controller in response to a telemetry difference exceeding a telemetry parameter threshold. The telemetry difference includes a difference between the telemetry parameter and the previous telemetry parameter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
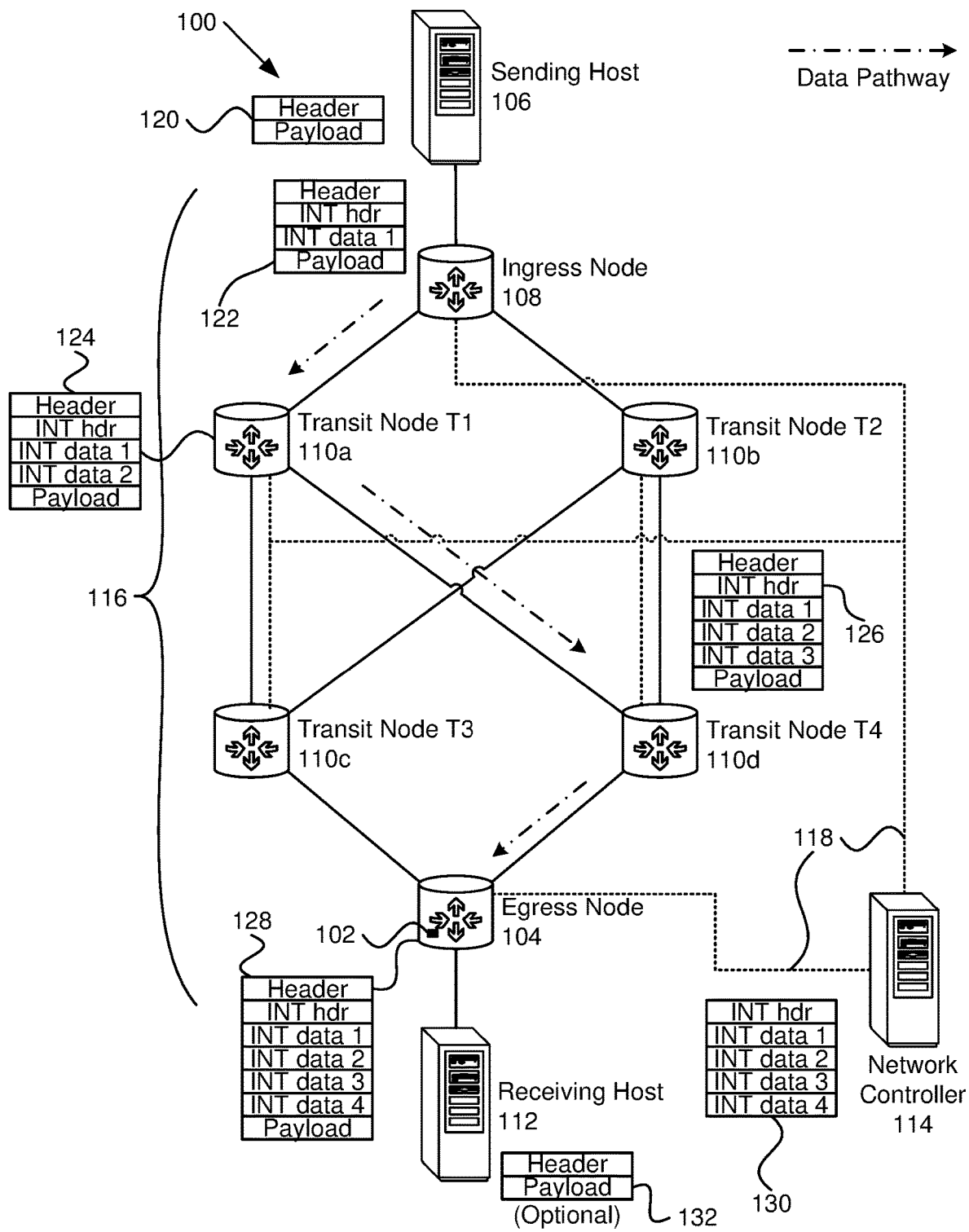
FIG. 1 is a schematic block diagram illustrating a data network for in-band telemetry rate limiting, according to various embodiments.

As will be appreciated by one skilled in the art, aspects of the embodiments may be embodied as an apparatus, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "apparatus." Furthermore, embodiments may take the form of a program product embodied in one or more computer readable storage devices storing machine readable code, computer readable code, and/or program code, referred hereafter as code. The storage devices, in some embodiments, are tangible, non-transitory, and/or non-transmission. The storage devices, in some embodiments, do not embody signals.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

A method for in-band telemetry rate limiting is disclosed. An apparatus and computer program product also perform the functions of the method. Embodiments of the method include receiving a telemetry packet at an egress node of a data pathway in a data network. The data pathway includes an ingress node, transit nodes and the egress node and the telemetry packet includes a telemetry parameter where the telemetry parameter is for a node in the data pathway. The method includes comparing the telemetry parameter with a previous telemetry parameter from a previous telemetry packet received at the egress node prior to receiving the telemetry packet, and transmitting telemetry data from the telemetry packet to a network controller in response to a telemetry difference exceeding a telemetry parameter threshold. The telemetry difference includes a difference between the telemetry parameter and the previous telemetry parameter.

In some embodiments, the method includes dropping telemetry data from the telemetry packet in response to the telemetry difference being less than the telemetry parameter threshold. In other embodiments, the method includes determining an expiration status of a periodic telemetry timer, and transmitting telemetry data from the telemetry packet to the network controller in response to determining that the periodic telemetry timer has expired.

In other embodiments, the method includes, in response to the telemetry difference being less than the telemetry parameter threshold, determining an expiration status of a telemetry change timer, and decreasing the telemetry parameter threshold in response to determining that the telemetry change timer has expired. In other embodiments, the method includes determining a telemetry data transmittal rate of telemetry packets transmitted to the network controller, and increasing the telemetry parameter threshold in response to determining that the telemetry data transmittal rate exceeding a transmittal rate threshold. In other embodiments, the telemetry data transmittal rate includes a number of telemetry packets transmitted to the network controller compared with a number of telemetry packets dropped and/or a number of telemetry packets received at the egress node over a period of time.

In some embodiments, the method includes calculating an end-to-end telemetry parameter from telemetry parameters of a same type for each node in the data pathway, comparing the end-to-end telemetry parameter with an end-to-end telemetry threshold, and transmitting telemetry data from the telemetry packet to the network controller in response to the end-to-end telemetry parameter exceeding the end-to-end telemetry threshold. In further embodiments, the end-to-end telemetry parameter includes end-to-end latency for the data pathway and the end-to-end telemetry threshold includes an end-to-end latency threshold for the data pathway.

In other embodiments, the method includes tracking telemetry data for one or more data pathways where the telemetry data includes telemetry parameters, end-to-end telemetry parameters, a telemetry data transmittal rate to the network controller, and/or a number of dropped telemetry packets. In the embodiments, the method includes using a machine learning algorithm to determine one or more trends associated with telemetry data, and adjusting the telemetry parameter threshold and/or an end-to-end telemetry parameter threshold based on one or more of the trends determined by the machine learning algorithm. In other embodiments, the telemetry parameter includes hop latency, queue occupancy, number of data packets transmitted by a node per second, and/or buffer occupancy.

An apparatus for in-band telemetry rate limiting includes a processor and a memory storing code. The code is executable by the processor to perform operations that include receiving a telemetry packet at an egress node of a data pathway in a data network. The data pathway includes an ingress node, transit nodes and the egress node and the telemetry packet includes a telemetry parameter where the telemetry parameter is for a node in the data pathway. The code is executable by the processor to perform operations that include comparing the telemetry parameter with a previous telemetry parameter from a previous telemetry packet received at the egress node prior to receiving the telemetry packet, and transmitting telemetry data from the telemetry packet to a network controller in response to a telemetry difference exceeding a telemetry parameter threshold. The telemetry difference includes a difference between the telemetry parameter and the previous telemetry parameter.

In some embodiments, the operations include dropping telemetry data from the telemetry packet in response to the telemetry difference being less than the telemetry parameter threshold. In other embodiments, the operations include determining an expiration status of a periodic telemetry timer, and transmitting telemetry data from the telemetry packet to the network controller in response to determining that the periodic telemetry timer has expired. In further embodiments, the operations include, in response to the telemetry difference being less than the telemetry parameter threshold, determining an expiration status of a telemetry change timer, and decreasing the telemetry parameter threshold in response to determining that the telemetry change timer has expired. In other embodiments, the operations include determining a telemetry data transmittal rate of telemetry packets transmitted to the network controller, and increasing the telemetry parameter threshold in response to determining that the telemetry data transmittal rate exceeding a transmittal rate threshold.

In some embodiments, the operations include calculating an end-to-end telemetry parameter from telemetry parameters of a same type for each node in the data pathway, comparing the end-to-end telemetry parameter with an end-to-end telemetry threshold, and transmitting telemetry data from the telemetry packet to the network controller in response to the end-to-end telemetry parameter exceeding the end-to-end telemetry threshold. In other embodiments, the operations include tracking telemetry data for one or more data pathways where the telemetry data includes telemetry parameters, end-to-end telemetry parameters, a telemetry data transmittal rate to the network controller, and/or a number of dropped telemetry packets. In the embodiments, the operations include using a machine learning algorithm to determine one or more trends associated with telemetry data, and adjusting the telemetry parameter threshold and/or an end-to-end telemetry parameter threshold based on one or more of the trends associated determined by the machine learning algorithm.

A program product for in-band telemetry rate limiting includes a non-volatile computer readable storage medium storing code. The code is configured to be executable by a processor to perform operations that include receiving a telemetry packet at an egress node of a data pathway in a data network. The data pathway includes an ingress node, transit nodes and the egress node and the telemetry packet includes a telemetry parameter where the telemetry parameter is for a node in the data pathway. The code is configured to be executable by a processor to perform operations that include comparing the telemetry parameter with a previous telemetry parameter from a previous telemetry packet received at the egress node prior to receiving the telemetry packet, and transmitting telemetry data from the telemetry packet to a network controller in response to a telemetry difference exceeding a telemetry parameter threshold. The telemetry difference includes a difference between the telemetry parameter and the previous telemetry parameter.

In some embodiments, the code is configured to be executable by a processor to perform operations that include dropping telemetry data from the telemetry packet in response to the telemetry difference being less than the telemetry parameter threshold. In other embodiments, the code is configured to be executable by a processor to perform operations that include calculating an end-to-end telemetry parameter from telemetry parameters of a same type for each node in the data pathway, comparing the end-to-end telemetry parameter with an end-to-end telemetry threshold, and transmitting telemetry data from the telemetry packet to the network controller in response to the end-to-end telemetry parameter exceeding the end-to-end telemetry threshold.

FIG. 1 is a schematic block diagram illustrating a data network for 100 in-band telemetry rate limiting, according to various embodiments. The data network 100 includes a telemetry limiting apparatus 102 in an egress node 104 of a data pathway. The data pathway includes a sending host 106 connected to an egress node 104 and several transit nodes T1-T4 110a-110d (generically or collectively "110"), a receiving host 112 connected to the egress node 104, and a network controller 114 connected to each node 104, 108, 110, which are described below.

The data network 100 includes a sending host 106 and a receiving host 112, which are computing devices connected to network nodes 116 of the data network 100. The computing devices may be a host, a server, a workstation, a portable electronic device, etc. For example, the data network 100 may be in a data center, may be part of a computer network of a company, or other data network where a network controller 114 communicates with each network node 116. In the embodiments described herein, in-band refers to data flows, telemetry information, etc. that are controlled by the network controller 114 rather than external networks administered by various parties. For example, the sending host 106 and/or receiving host 112 may be part of multi-tenant servers with virtual machines each accessed by a client. In some embodiments, the sending host 106 and the receiving host 112 are computing devices configured for user access with a direct data connection to the ingress node 108 or egress node 104. In some embodiments, the data network 100 includes a connection to one or more external networks, such as the Internet, a wide-area-network, a cellular network, and the like.

The network nodes 116, are data transmission devices that facilitate receiving and sending data packets from the sending host 106 to the receiving host 112. A network node 116 may be a switch, a router or other transport device. In some embodiments, the network nodes 116 are layer-4 devices where layer-4 is the fourth layer in the Open Systems Interconnection ("OSI") Model. In other embodiments, the network nodes 116 transmit packets using transmission control protocol/internet protocol ("TCP/IP"), user datagram protocol ("UDP") or other protocol. While six network nodes 116 (e.g. 108, 110, 104) are depicted in FIG. 1, the data network 100 may include more nodes or less nodes. The network nodes 116 typically include a discovery mechanism that discovers connected network nodes 116 and other devices, such as the sending host 106 and receiving host 112 where information about the connected devices 106, 112, 116 are stored in a routing table. The routing table is some type of data structure, such as a register, a database, etc. Typically, the routing table includes whether or not a particular device, such as the sending host 106 or receiving host 112 are directly connected to a network node 116.

The routing table may also include a particular egress port of a network node 116 that connects to a downstream network node 116. For example, transit node T1 110*a* may be connected to transit node T3 110*c* on egress port A and to transit node T4 110*d* on egress port B. The routing table, in some embodiments, includes which egress port of a network node 116 connects to a downstream network node 116. Typically, each network node 116 includes more than one egress port. For example, a network node 116 may include 128 egress ports. Typically, each network node 116 includes a plurality of ingress ports, which may also be listed in the routing table. In other embodiments, each network node 116 includes a table or other data structure that stores information about which downstream network node 116 is connected to each egress port and which upstream network node 116 is connected to each ingress port and an external routing table keeps track of network node connections without port information. In other embodiments, the data network 100 uses segment routing where the ingress node 108 determines the data pathway and a data packet header includes data pathway information. In segment routing, identification of an egress node 104 is preserved.

Each egress port of a network node 116 includes two or more queues (e.g. egress queues). In some embodiments, each egress port includes 10 queues. For example, an egress port may use eight queues for uni-path data transmission and may have two queues for multi-path data transmission. Other egress ports have 16 queues or other number of queues. In some embodiments, each queue of an egress port is assigned a priority level. For example, a first queue may be a highest priority queue, a second queue may be a second highest priority queue. Priority of the egress ports is typically used to segregate data packets based on a priority level of the data packets. Typically, some data packets are higher priority than other data packets so that the queues of an egress port allow higher level data packets to be sent before lower level data packets. Sending of data packets from the various queues, in some embodiments, is subject to particular rules to allow prioritizing data packets while ensuring all data packets are sent. Typically, telemetry data for queues of ports is included in telemetry data stored as metadata in a telemetry packet along with latency information and other telemetry information.

As the data network 100 changes, data paths change which may affect routing from a sending host 106 to a receiving host 112, which affects telemetry routing and telemetry data collected at each network node 116. The network nodes 116 are connected to a network controller 114. In some embodiments, the network nodes 116 are connected to the network controller 114 over a back channel 118 which is not part of data flow between the sending host 106 and the receiving host 112. In one embodiment, the network controller 114 communicates with the network nodes 116 over network connections that carry data. In other embodiments, the network controller 114 communicates with the network nodes 116 over a back channel 118 that is a side-band or out-of-band connection that is not part of data flow. In some embodiments, the network controller 114 is connected directly to each network node 116. In other embodiments, the network controller 114 is connected indirectly to at least some network nodes 116. One of skill in the art will recognize other ways to connect the network controller 114 to the network nodes 116 and other ways to for the network controller 114 to manage the network nodes 116.

The data network 100 may include wired connections, fiber optic connections, wireless connections, or the like or any combination thereof. The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA" ®). Alternatively, the wireless connection may be a cellular telephone network communication. All standards and/or connection types include the latest version and revision of the standard and/or connection type as of the filing date of this application.

As depicted in FIG. 1, the egress node 104 includes a telemetry limiting apparatus 102. The telemetry limiting apparatus 102 receives a telemetry packet at the egress node 104 of a data pathway that includes an ingress node 108, transit nodes 110, and the egress node 104. The telemetry packet includes a telemetry parameter for a node in the data pathway. The telemetry limiting apparatus 102 compares the telemetry parameter of the telemetry packet with a previous telemetry parameter from a previous telemetry packet received at the egress node 104 just prior to the telemetry limiting apparatus 102 receiving the current telemetry packet. The telemetry limiting apparatus 102 transmits the current telemetry packet to the network controller 114 if a difference between the telemetry parameter and the previous telemetry parameter exceeds a telemetry parameter threshold. Where the difference is less than the telemetry parameter threshold, the telemetry limiting apparatus 102 drops the telemetry packet.

In some embodiments, the telemetry packet is a dedicated packet traverses the same data pathway as data packets being transmitted from the sending host 106 to the receiving host 112 but does not include a payload that is transmitted from the egress node 104 to the receiving host 112. In the embodiments, a data header and payload may be copied from a data packet. Having a dedicated telemetry packet with a payload, in some embodiments, is beneficial to more accurately simulate a data packet being transmitted from the ingress node 108 to the egress node 104. In other embodiments, dedicated telemetry packets do not have a payload.

In other embodiments, the telemetry packet is a data packet that traverses the data pathway from the sending host 106 to the receiving host 112 and includes a payload that is transmitted from the egress node 104 to the receiving host 112. In the embodiments, telemetry data is stripped from the telemetry packet and transmitted to the network controller 114 while the data header and payload are forwarded to the receiving host 112. Where a data packet is utilized to transport telemetry data, which is called a telemetry packet herein, often not all data packets in a data pathway include telemetry data but instead only a portion of the data packets in a particular data flow include telemetry data. Data packets are processed normally while telemetry packets are stripped of telemetry data at the egress node 104 before the data packet is transmitted to the receiving host 112.

The data network 100 of FIG. 1 includes an example of transmission of a telemetry packet. In the example, a data packet 120 with a header and payload originates at the sending host 106. In the example, INT is "in-band network telemetry." In some embodiments, a telemetry packet 122 at the ingress node 108 is created with a copied header and payload of the data packet 120 along with a telemetry header ("INT hdr"). In other embodiments, a telemetry packet 122 at the ingress node 108 is created by adding a telemetry header to a data packet. Telemetry data ("INT data 1") is added to the telemetry packet at the ingress node 108 before being transmitted to transit node T1 110a. Telemetry data from transit node T1 110a ("INT data 2") is added to the telemetry packet 124 at transit node T1 110a before being sent to transit node T4 110d.

Telemetry data from transit node T4 ("INT data 3") is added to the telemetry packet 126 at transit node T4 110d before being sent to the egress node 104. Telemetry data ("INT data 4") from the egress node 104 is added to the telemetry packet 128 at the egress node 104. The telemetry limiting apparatus 102 transmits the telemetry data 130 to the network controller 114 when a difference between a current telemetry parameter and a previous telemetry parameter exceeds a telemetry parameter threshold. In embodiments where the telemetry packet is also a data packet, the egress node 104 transmits the header and payload 132 to the receiving host 112. The telemetry limiting apparatus 102 is described in more detail with regards to the apparatuses 200, 300 of FIGS. 2 and 3.

The data network 100 depicts only two hosts and a few network nodes 116, however, the data network 100 is representative of other data networks with more hosts and other devices connected to network nodes as well as data networks with more network nodes in other configurations. The network nodes 116 are depicted with multiple data paths from the sending host 106 to the receiving host 112. Additional parallel data paths may also exist from the sending host 106 to the receiving host 112. Often, a preferred data path exists from a sending host 106 to a receiving host 112, but other data paths may be used, for example, if the preferred pathway is unavailable, is slow, etc.

In addition, the data network 100 is depicted for data packets flowing from the sending host 106 to the receiving host 112, but in other embodiments, data packets may flow in an opposite direction so that the receiving host 112 becomes a sending host, the sending host 106 becomes a receiving host, the egress node 104 becomes an ingress node, the ingress node 108 becomes and egress node, which includes a telemetry limiting apparatus 102. Other data networks include other hosts that serve as sending or receiving hosts, each connected to a network node 116 serving as a ingress node or egress node.

Figure 2:
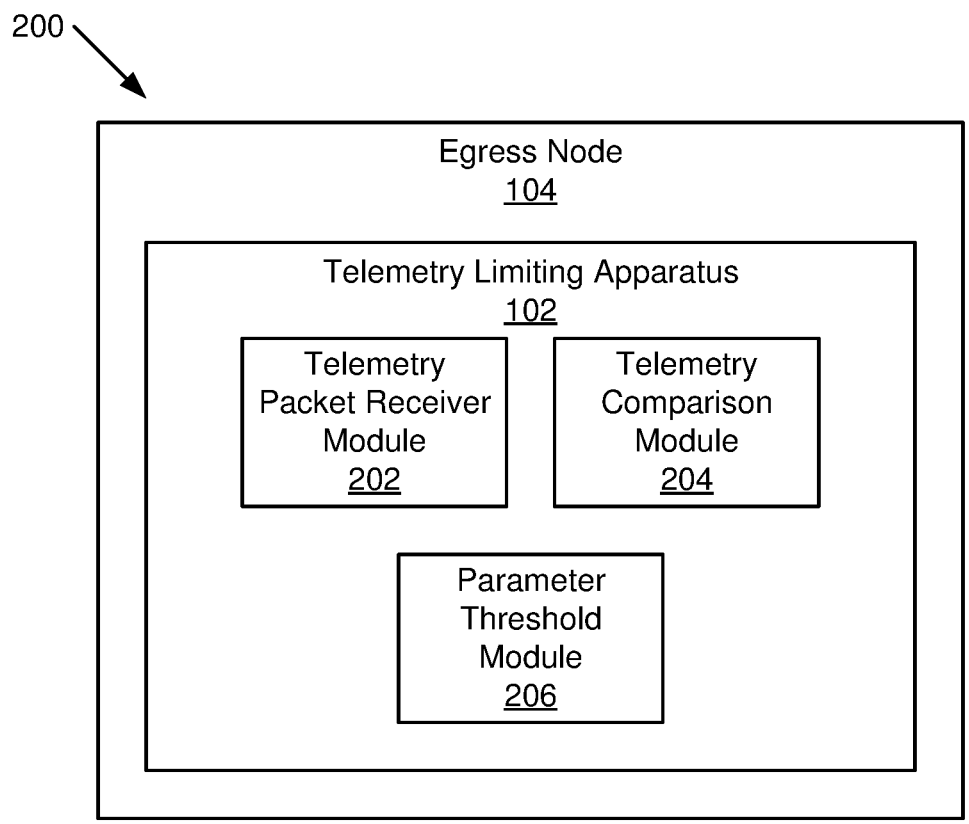
FIG. 2 is a schematic block diagram illustrating an apparatus for in-band telemetry rate limiting, according to various embodiments.

FIG. 2 is a schematic block diagram illustrating an apparatus 200 for in-band telemetry rate limiting, according to various embodiments. The apparatus 200 includes, in an egress node 104, a telemetry limiting apparatus 102 that includes a telemetry packet receiver module 202, a telemetry comparison module 204, and a parameter threshold module 206, which are described below. In various embodiments, the apparatus 200 is fully or partially implemented with hardware circuits. In some examples, the hardware circuits include an ASIC, discrete logic components, etc. In other embodiments, all or a portion of the apparatus 200 is implemented with a programmable hardware device, such as an FPGA. In other embodiments, all or a portion of the apparatus 200 is implemented as code stored on a non-transitory computer readable storage device executable on a processor and/or controller. One of skill in the art will recognize other ways to implement the apparatus 200.

The telemetry packet receiver module 202 is configured to receive a telemetry packet at an egress node 104 of a data pathway in a data network 100. The data pathway includes an ingress node 108, transit nodes 110 and the egress node 104. The telemetry packet includes at least one telemetry parameter where the telemetry parameter is for a node in the data pathway.

At each network node 116, telemetry parameters are added to the telemetry packet. A telemetry parameter is any parameter added to a telemetry header by a network node 116. Typical network nodes 116, such as routers, switches, etc. keep track of various parameters useful in tracking operation of the network node 116. Typically, one or more timestamps are added to a header and/or telemetry header, which is useful in determining latency. A typical telemetry parameter is hop latency, which in some embodiments is a measure of how long the network node 116 takes to transmit a received a data packet and/or a telemetry packet to a next network node 116. One of skill in the art will recognize various ways to determine hop latency.

Another telemetry parameter that is useful in determining performance of a network node 116 is queue occupancy. Typically, a queue identifier ("ID") is recorded along with a number of data/telemetry packets in the queue. In some embodiments, the queue ID and queue occupancy are recorded for more than one queue in the network node 116. Another often used telemetry parameter is Egress Interface Tx Utilization, which is a measure of how many data/telemetry packets are being transmitted in a particular amount of time, such as packets per second.

Another telemetry parameter that is useful in determining performance of a network node 116 is buffer occupancy. Typically, data packets and telemetry packets are stored in memory after they are received at an ingress port of a network node 116. The memory of the network node 116 is often divided into buffers, such as a multicast buffer for multicast data packets, a unicast buffer for unicast data packets, and the like. Queues typically include an address of a data/telemetry packet in a queue entry rather than the actual data/telemetry packet. Typically, a buffer ID is recorded along with an amount of data/telemetry packets in the buffer as buffer occupancy. In some embodiments, the buffer ID and buffer occupancy are recorded for more than one buffer in the network node 116. One of skill in the art will recognize other telemetry parameters tracked by a network node 116.

The apparatus 200 includes a telemetry comparison module 204 configured to compare the telemetry parameter with a previous telemetry parameter from a previous telemetry packet received at the egress node 104 prior to receiving the telemetry packet. The telemetry comparison module 204 and/or the telemetry limiting apparatus 102 stores the telemetry parameter of the previous telemetry packet for comparison with a current telemetry parameter.

In some embodiments, the telemetry comparison module 204 compares a same telemetry parameter of a same network node 116. For example, where the telemetry is hop latency for transit node T1 110a, the telemetry comparison module 204 compares hop latency for transit node T1 110a from a previously received telemetry packet with the hop latency for transit node T1 110a from the telemetry packet received by the telemetry packet receiver module 202. The telemetry comparison module 204 and/or the telemetry limiting apparatus 102 stores for comparison the hop latency of transit node T1 110a from the telemetry packet received just prior to the current telemetry packet.

Where the telemetry parameter is queue occupancy of queue 3 of transit node T4 110d, the telemetry comparison module 204 and/or the telemetry limiting apparatus 102 saves the queue occupancy of queue 3 of transit node T4 110d from the last telemetry packet and compares this previous queue occupancy of queue 3 of transit node T4 110d with a current queue occupancy of queue 3 of transit node T4 110d in the current telemetry packet. Note that the discussion above is for a single telemetry parameter for simplicity. In various embodiments, the telemetry comparison module 204 compares numerous telemetry parameters from some or all of the network nodes 116 with same telemetry parameters from the previously received telemetry packet.

The apparatus 200 includes a parameter threshold module 206 configured to transmit telemetry data from the telemetry packet to a network controller 114 in response to a telemetry difference exceeding a telemetry parameter threshold. The telemetry difference includes a difference between the telemetry parameter and the previous telemetry parameter. The telemetry parameter threshold is an amount where changes in the telemetry parameter below this telemetry parameter threshold result in the telemetry packet being dropped and changes in the telemetry parameter from a previous telemetry packet to the current telemetry that exceed the telemetry parameter threshold result in the parameter threshold module 206 transmitting telemetry data from the telemetry packet to the network controller 114.

In some embodiments, transmitting telemetry data from the telemetry packet includes transmitting the telemetry packet. In other embodiments, transmitting telemetry data from the telemetry packet includes stripping telemetry data from the telemetry packet and transmitting the telemetry data. The telemetry data, in some embodiments, includes the telemetry header, data packet header information, and/or other information useful in identifying the data pathway and other relevant information about a data flow along the data pathway.

In some embodiments, transmitting telemetry data from the telemetry packet includes transmitting all telemetry data from the telemetry packet even though a single telemetry parameter exceeds the telemetry parameter threshold. In other embodiments, transmitting telemetry data from the telemetry packet includes transmitting just the telemetry parameter exceeding the telemetry parameter threshold or transmitting a subset of telemetry data from the telemetry packet.

Figure 3:
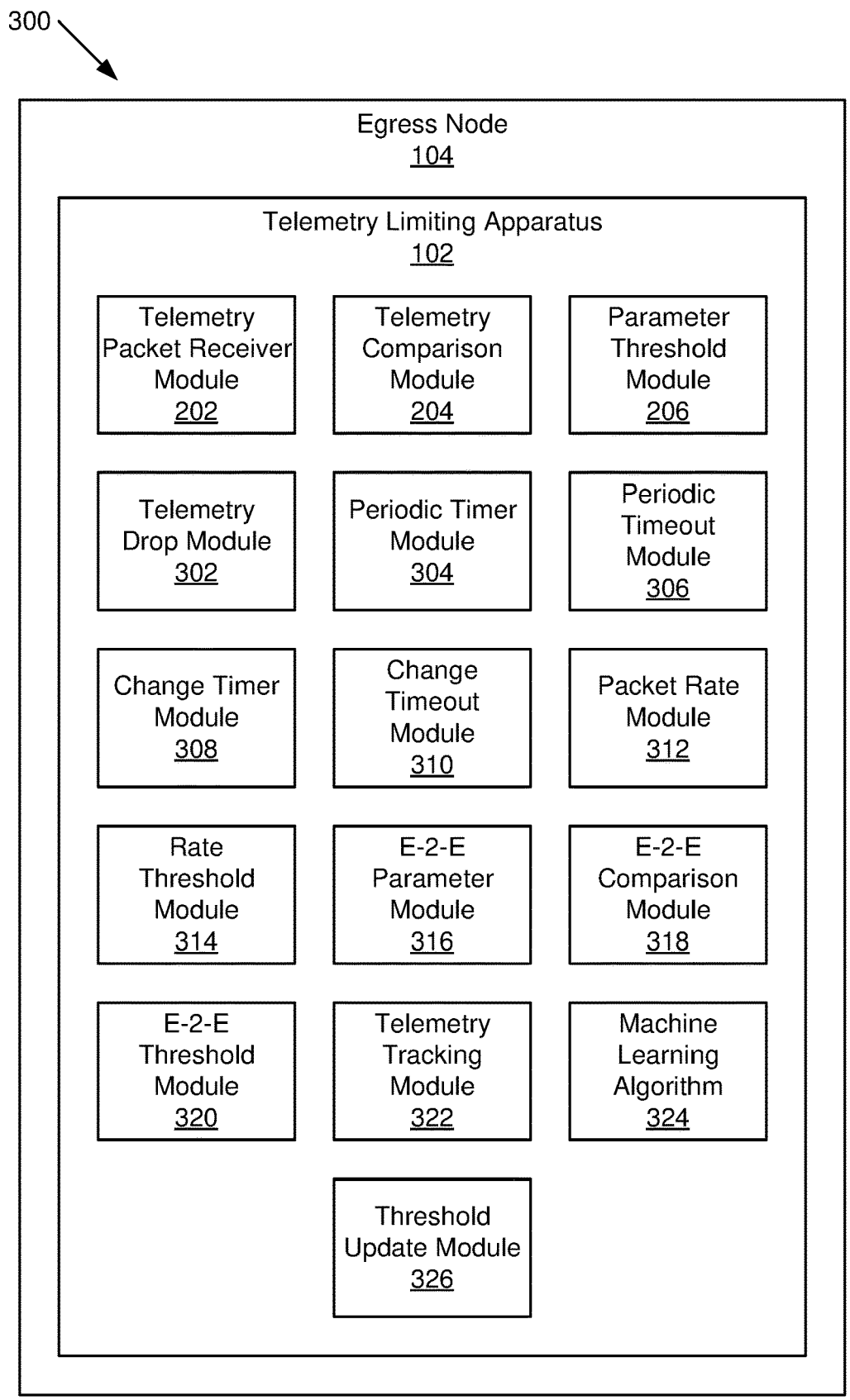
FIG. 3 is a schematic block diagram illustrating another apparatus for in-band telemetry rate limiting, according to various embodiments.

FIG. 3 is a schematic block diagram illustrating another apparatus 300 for in-band telemetry rate limiting, according to various embodiments. The apparatus 300 includes, in an egress node 104, another telemetry limiting apparatus 102 with a telemetry packet receiver module 202, a telemetry comparison module 204, and a parameter threshold module 206, which are substantially similar to those described above in relation to the apparatus 200 of FIG. 2. In various embodiments, the telemetry limiting apparatus 102 includes a telemetry drop module 302, a periodic timer module 304, a periodic timeout module 306, a change timer module 308, a change timeout module 310, a packet rate module 312, a rate threshold module 314, an end-to-end ("E-2-E") parameter module 316, an end-to-end comparison module 318, an end-to-end threshold module 320, a telemetry tracking module 322, a machine learning algorithm 324, and/or a threshold update module 326, which are described below. In various embodiments, the apparatus 300 is implemented similar to the apparatus 200 of FIG. 2.

Figure 4:
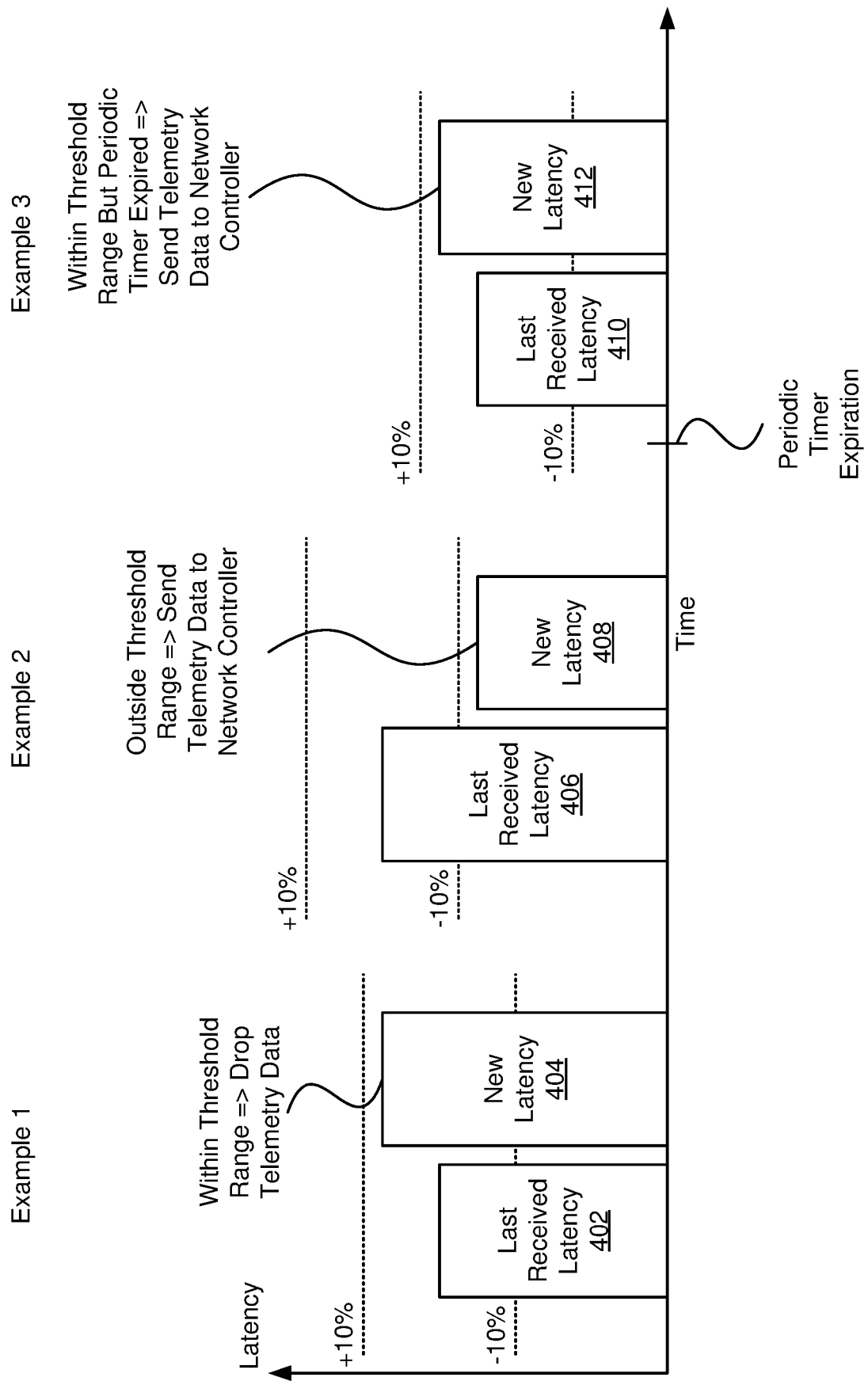
FIG. 4 is a diagram illustrating examples of transmitting and dropping telemetry packets.

The apparatus 300 includes a telemetry drop module 302 configured to drop telemetry data from the telemetry packet in response to the telemetry difference being less than the telemetry parameter threshold. FIG. 4 is a diagram 400 illustrating examples of transmitting and dropping telemetry packets. The diagram 400 illustrates latency on a vertical axis and time on a horizontal axis. Note that the diagram 400 is not to scale. Example 1 depicts last received latency 402 from a previous telemetry packet and a telemetry parameter threshold in the form of a latency threshold of plus and minus 10 percent from the level of the last received latency 402.

The new latency 404 from the current telemetry packet received by the telemetry packet receiver module 202 has a level (top edge) that is within the plus and minus 10 percent latency threshold so the telemetry drop module 302 drops telemetry data from the telemetry packet. As used herein, dropping telemetry data from the telemetry packet includes not sending a telemetry packet to the network controller 114 where dedicated telemetry packets are used and not sending telemetry data stripped from a data packet with telemetry information to the network controller 114 where a data packet includes telemetry data and the data packet header and payload are forwarded to the receiving host 112.

In example 2 of FIG. 4, the new latency 404 from example 1 becomes the last received latency 406 in example 2. Note that the latency threshold remains at plus and minus 10 percent but the latency threshold shifts up to be centered on the level of the last received latency 406. A new latency 408 from a current telemetry packet received by the telemetry packet receiver module 202 has a level that is outside the latency threshold so the parameter threshold module 206 transmits telemetry data from the telemetry packet to the network controller 114.

The apparatus 300 includes, in some embodiments, a periodic timer module 304 configured to determining an expiration status of a periodic telemetry timer and a periodic timeout module 306 configured to transmit telemetry data from the telemetry packet to the network controller 114 in response to determining that the periodic telemetry timer has expired. The periodic telemetry timer is configured to transmit telemetry data on a periodic basis so that after a prolonged period of not dropping telemetry data that the telemetry data is still transmitted to the network controller 114. For example, a pattern of a telemetry parameter increasing or decreasing may occur even though the difference between any current and previous telemetry parameters is not enough to exceed the telemetry parameter threshold. The periodic telemetry timer is a convenient mechanism to detect a slow increase or decrease and/or to send telemetry data to the network controller 114 on a consistent basis as a minimum.

In some embodiments, the periodic timer module 304 maintains a single periodic telemetry timer for the data pathway and determines if the periodic telemetry timer is expired. In other embodiments, the periodic timer module 304 maintains more than one periodic telemetry timer, such as a periodic telemetry timer for each type of telemetry parameter, and separately determines if each periodic telemetry timer has expired. In some embodiments, the periodic timer module 304 determines the expiration status of the periodic telemetry timer. In some embodiments, the periodic timer module 304 also resets the periodic telemetry timer each time the parameter threshold module 206 transmits telemetry data from the telemetry packet so the periodic timer module 304 checks the expiration status of the periodic telemetry timer each time the telemetry drop module 302 drops telemetry data from the telemetry packet. In other embodiments, the periodic timer module 304 determines the status of the periodic telemetry timer independent of whether or not the telemetry drop module 302 drops telemetry data or the parameter threshold module 206 transmits the telemetry data.

Example 3 of FIG. 4 illustrates a continuation of example 2 where the new latency 408 of example 2 is the last received latency 410 and the latency threshold is updated accordingly. The new latency 412 from a current telemetry parameter of a current telemetry packet is within the plus and minus 10 percent latency threshold but the periodic telemetry timer has expired so the periodic timeout module 306 transmits telemetry data from the current telemetry packet to the network controller 114.

The apparatus 300, in some embodiments, includes a change timer module 308 configured to determine an expiration status of a telemetry change timer in response to the telemetry difference being less than the telemetry parameter threshold and the change timeout module 310 is configured to decrease the telemetry parameter threshold in response to determining that the telemetry change timer has expired. The telemetry change timer functions to track how long telemetry data is not sent to the network controller 114 to determine when the telemetry parameter threshold should be changed. The telemetry parameter threshold may be set too high so that telemetry data from received telemetry packets are not transmitted to the network controller 114 or are transmitted only with the expiration of the periodic telemetry timer. The change timeout module 310 decreases the telemetry parameter threshold to increase the frequency that telemetry data is transmitted to the network controller 114.

In some embodiments, the telemetry change timer is a function of time. In other embodiments, the telemetry change timer is a counter that counts a number of times telemetry data is dropped and the telemetry change timer expiration is when the counter reaches a particular number. In some embodiments, the change timeout module 310 changes the telemetry parameter threshold a fixed amount, such as a 20 percent decrease. In other embodiments, the change timeout module 310 adaptively changes the telemetry parameter threshold and includes an algorithm to determine how much to change the telemetry parameter threshold.

In some embodiments, the periodic telemetry timer and the telemetry change timer function together. In such embodiments, the periodic telemetry timer is not reset at each transmission of telemetry data to the network controller 114. In other embodiments, the apparatus 300 does not include a periodic telemetry timer and the telemetry change timer functions to both periodically transmit telemetry data to the network controller 114 and to change the telemetry parameter threshold. One of skill in the art will recognize other ways to utilize a telemetry change timer to decrease the telemetry parameter threshold to increase the frequency of transmission of telemetry data to the network controller 114.

The apparatus 300, in some embodiments, includes a packet rate module 312 configured to determine a telemetry data transmittal rate of telemetry packets transmitted to the network controller 114 and a rate threshold module 314 configured to increase the telemetry parameter threshold in response to determining that the telemetry data transmittal rate exceeding a transmittal rate threshold. The packet rate module 312 and the rate threshold module 314 function to increase the telemetry parameter threshold when telemetry data is transmitted to the network controller 114 too often.

In some embodiments, the telemetry data transmittal rate is a number of telemetry packets transmitted to the network controller compared with a number of telemetry packets dropped. In other embodiments, the telemetry data transmittal rate is a number of telemetry packets transmitted to the network controller compared with a number of telemetry packets received at the egress node 104 over a period of time. One of skill in the art will recognize other ways to formulate the telemetry data transmittal rate. In some examples, the transmittal rate threshold may be set to 10 percent and the packet rate module 312 may determine that the telemetry data transmittal rate is 40 percent so the rate threshold module 314 increases the telemetry parameter threshold, which typically results in a reduction of the telemetry data transmittal rate.

The apparatus 300 includes, in some embodiments, an end-to-end parameter module 316 configured to calculate an end-to-end telemetry parameter from telemetry parameters of a same type for each node (e.g. 116) in the data pathway. For example, the end-to-end parameter module 316 may calculate an end-to-end hop latency for the data pathway. In the embodiments, the apparatus 300 includes an end-to-end comparison module 318 configured to compare the end-to-end telemetry parameter with an end-to-end telemetry threshold and an end-to-end threshold module 320 configured to transmit telemetry data from the telemetry packet to the network controller 114 in response to the end-to-end telemetry parameter exceeding the end-to-end telemetry threshold.

Calculation of end-to-end telemetry parameters provides another mechanism to send telemetry data to the network controller 114 when a problem may exist. For example, a high end-to-end hop latency may signal the network controller 114 to make changes to traffic flow. Where the end-to-end telemetry parameter is below the end-to-end telemetry threshold, the telemetry data is not transmitted to the network controller 114 based on end-to-end telemetry parameters but the telemetry data may be transmitted based on another telemetry parameter difference exceeding a corresponding telemetry parameter threshold or based on the period telemetry timer.

The apparatus 300, in some embodiments, includes a telemetry tracking module 322 configured to track telemetry parameters, for one or more data pathways, end-to-end telemetry parameters, a telemetry data transmittal rate to the network controller, a number of dropped telemetry packets, and the like. The apparatus 300 uses a machine learning algorithm 324 to determine one or more trends associated with telemetry packets. The apparatus 300, in the embodiments, includes a threshold update module 326 configured to adjust the telemetry parameter threshold and/or an end-to-end telemetry parameter threshold based on one or more of the trends determined by the machine learning algorithm 324.

The telemetry tracking module 322, in some embodiments, tracks telemetry data over time to for the machine learning algorithm 324 to determine one or more trends. For example, the machine learning algorithm 324 may identify certain times of day when there are more changes to the telemetry data than other times. The threshold update module 326, in some embodiments, uses the identified trends to increase the telemetry parameter thresholds during the times of day where there are more changes to the telemetry data and decreases the telemetry parameter thresholds during time of day when the telemetry data does not change as much. In other embodiments, the machine learning algorithm 324 identifies trends associated with queue capacity and adjusts telemetry parameter thresholds associated with queue capacity.

In some embodiments, the telemetry tracking module 322 continuously tracks telemetry data. The machine learning algorithm 324 uses the additional data to update trends, to find new trends, etc. in the telemetry data. The threshold update module 326 uses the updated trends to further update telemetry parameter thresholds.

Figure 5:
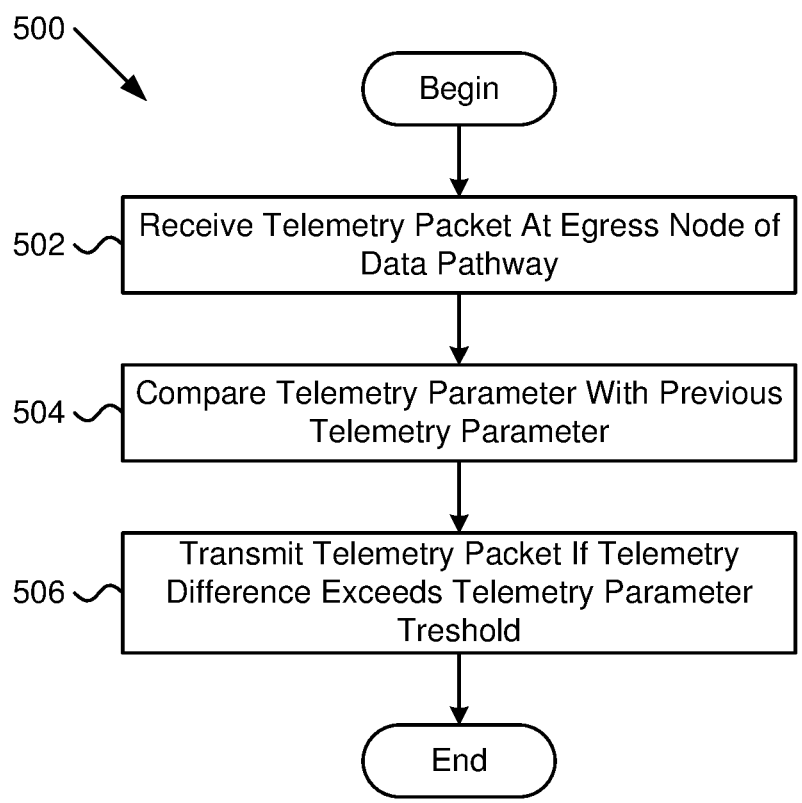
FIG. 5 is a schematic flow chart diagram illustrating a method for in-band telemetry rate limiting, according to various embodiments.

FIG. 5 is a schematic flow chart diagram illustrating a method 500 for in-band telemetry rate limiting, according to various embodiments. The method 500 begins and receives 502 a telemetry packet at an egress node 104 of a data pathway in a data network 100. The data pathway includes an ingress node 108, transit nodes 110 and the egress node 104. The telemetry packet includes a telemetry parameter where the telemetry parameter is for a node (e.g. 116) in the data pathway.

The method 500 compares 504 the telemetry parameter with a previous telemetry parameter from a previous telemetry packet received at the egress node 104 prior to receiving the telemetry packet and transmits 506 telemetry data from the telemetry packet to a network controller 114 in response to a telemetry difference exceeding a telemetry parameter threshold, and the method 500 ends. The telemetry difference is a difference between the telemetry parameter and the previous telemetry parameter. In various embodiments, all or a portion of the method 500 is implemented using the telemetry packet receiver module 202, the telemetry comparison module 204, and/or the parameter threshold module 206.

Figure 6A:
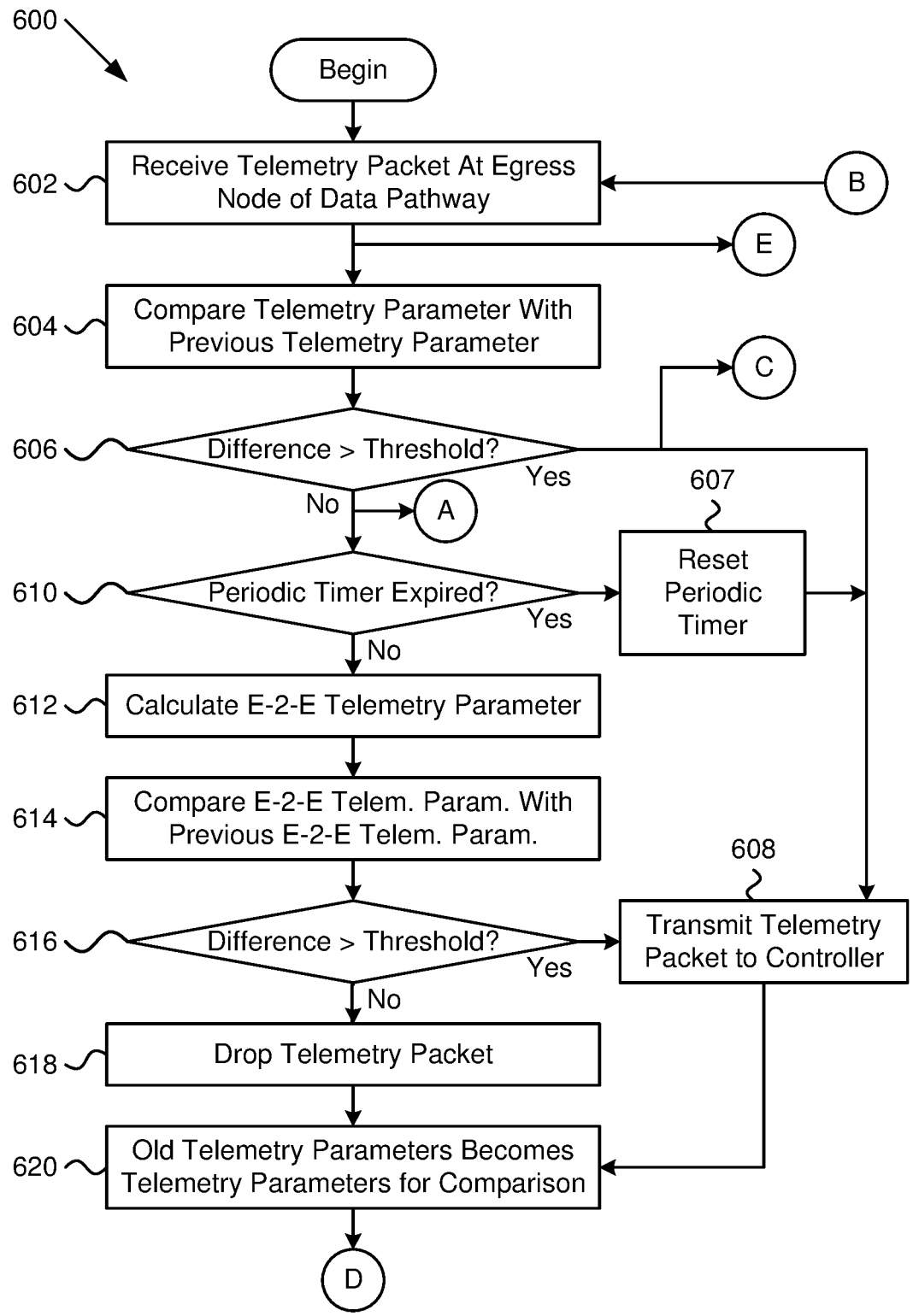
FIG. 6A is a first part of a schematic flow chart diagram illustrating another method for in-band telemetry rate limiting, according to various embodiments.
Figure 6B:
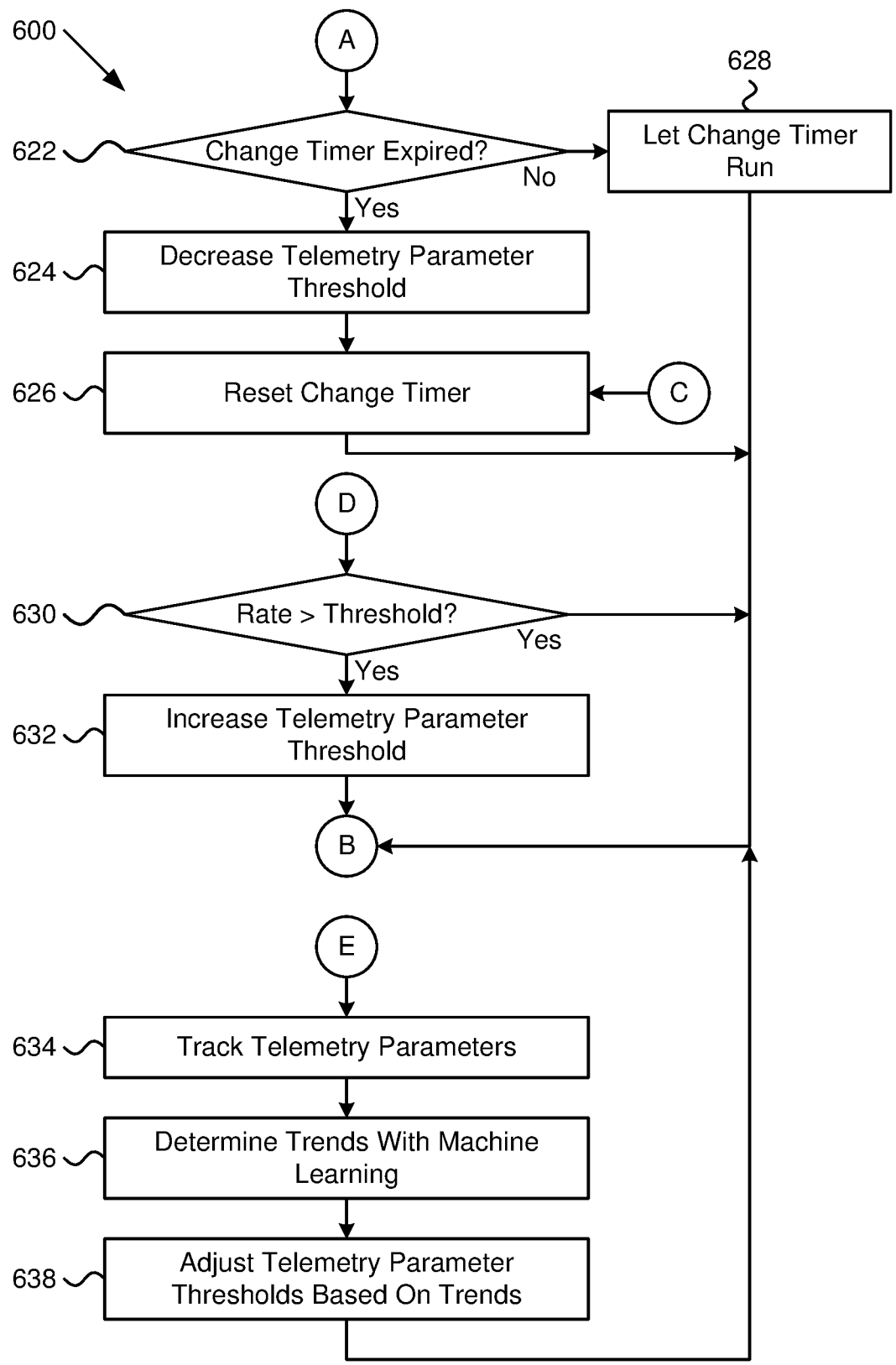
FIG. 6B is a second part of the schematic flow chart diagram of the method of FIG. 6A.

FIG. 6A is a first part and FIG. 6B is a second part of a schematic flow chart diagram illustrating another method 600 for in-band telemetry rate limiting, according to various embodiments. The method 600 begins and receives 602 a telemetry packet at an egress node 104 of a data pathway in a data network 100. The data pathway includes an ingress node 108, transit nodes 110 and the egress node 104. The telemetry packet includes a telemetry parameter where the telemetry parameter is for a node (e.g. 116) in the data pathway.

The method 600 compares 604 the telemetry parameter with a previous telemetry parameter from a previous telemetry packet received at the egress node 104 prior to receiving the telemetry packet and determines 606 if a telemetry difference exceeds a telemetry parameter threshold. The telemetry difference is a difference between the telemetry parameter and the previous telemetry parameter. If the method 600 determines 606 that the telemetry difference exceeds the telemetry parameter threshold, the method 600 transmits 608 telemetry data from the telemetry packet to a network controller 114.

If the method 600 determines 606 that the telemetry difference does not exceed the telemetry parameter threshold, in some embodiments, the method 600 determines 610 if the periodic telemetry timer has expired. In other embodiments (not shown), the method 600 determines 610 if the periodic telemetry timer has expired independent of determining 606 if the telemetry difference exceeds the telemetry parameter threshold. If the method 600 determines 610 that the periodic telemetry timer has expired, the method 600 resets 607 the periodic telemetry timer and transmits 608 telemetry data from the telemetry packet to a network controller 114. If the method 600 determines 610 that the periodic telemetry timer has not expired, the method 600 calculates 612 an end-to-end telemetry parameter from telemetry parameters of a same type for each node in the data pathway, compares 614 the end-to-end telemetry parameter with an end-to-end telemetry threshold, and determines 616 if the end-to-end telemetry parameter exceeds the end-to-end telemetry threshold.

If the method 600 determines 616 that the end-to-end telemetry parameter exceeds the end-to-end telemetry threshold, the method 600 transmits 608 telemetry data from the telemetry packet to a network controller 114. If the method 600 determines 616 that the end-to-end telemetry parameter does not exceed the end-to-end telemetry threshold, the method 600, the method 600 drops 618 telemetry data from the telemetry packet and the method 600 saves 620 the telemetry parameters from the telemetry packet, which become the previous telemetry parameters for comparison with telemetry parameters from a next telemetry packet. After the method 600 transmits 608 telemetry data of the telemetry packet to the network controller 114, the method 600 also saves 620 the telemetry parameters from the telemetry packet, which become the previous telemetry parameters for comparison with telemetry parameters from a next telemetry packet.

If the method 600 determines 606 that the telemetry difference exceeds the telemetry parameter threshold, the method 600 also determines 622 (follow "A" on FIG. 6A to "A" on FIG. 6B) if a telemetry change timer has expired. If the method 600 determines 622 that the telemetry change timer has expired, the method 600 decreases 624 the telemetry parameter threshold, resets 626 the telemetry change timer and returns and receives 602 a telemetry packet (follow "B" on FIG. 6B to "B" on FIG. 6A). If the method 600 determines 622 that the telemetry change timer has not expired, the method 600 lets 628 the telemetry change timer to continue to run and returns and receives 602 a telemetry packet (follow "B" on FIG. 6B to "B" on FIG. 6A). If the method 600 determines 606 that the telemetry difference exceeds the telemetry parameter threshold, the method 600 also resets 626 the telemetry change timer (follow "C" on FIG. 6A to "C" on FIG. 6B).

Following "D" on FIG. 6A to "D" on FIG. 6B, the method 600 determines 630 if a telemetry data transmittal rate of telemetry packets transmitted to the network controller 114 exceeds a transmittal rate threshold. If method 600 determines 630 that the telemetry data transmittal rate of telemetry packets transmitted to the network controller 114 exceeds the transmittal rate threshold, the method 600 increases 632 the telemetry parameter threshold and returns and receives 602 a telemetry packet (follow "B" on FIG. 6B to "B" on FIG. 6A). If method 600 determines 630 that the telemetry data transmittal rate of telemetry packets transmitted to the network controller 114 does not exceed the transmittal rate threshold, the method 600 returns and receives 602 a telemetry packet (follow "B" on FIG. 6B to "B" on FIG. 6A).

After the method 600 receives 602 a telemetry packet, as well as at other times and for other data pathways, the method 600 tracks 634 (follow "E" on FIG. 6A to "E" on FIG. 6B) telemetry data, for one or more data pathways, telemetry parameters, end-to-end telemetry parameters, a telemetry data transmittal rate to the network controller 114, a number of dropped telemetry packets, and the like, and determines 636 one or more trends associated with the telemetry data using a machine learning algorithm 324. The method 600 adjusts 638 telemetry parameter thresholds and/or end-to-end telemetry parameter thresholds based on one or more of the trends determined by the machine learning algorithm 324 and returns and receives 602 a telemetry packet (follow "B" on FIG. 6B to "B" on FIG. 6A).

In various embodiments, all or a portion of the method 600 is implemented using the telemetry packet receiver module 202, the telemetry comparison module 204, the parameter threshold module 206, the telemetry drop module 302, the periodic timer module 304, the periodic timeout module 306, the change timer module 308, the change timeout module 310, the packet rate module 312, the rate threshold module 314, the end-to-end parameter module 316, the end-to-end comparison module 318, the end-to-end threshold module 320, the telemetry tracking module 322, the machine learning algorithm 324, and/or the threshold update module 326.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    receiving a telemetry packet at an egress node of a data pathway in a data network, the data pathway comprising an ingress node, one or more transit nodes and the egress node, the telemetry packet comprising a telemetry parameter, the telemetry parameter for a node in the data pathway;
    comparing, at the egress node, the telemetry parameter with a previous telemetry parameter from a previous telemetry packet transmitted previously on the same data pathway and received at the egress node prior to receiving the telemetry packet;
    determining, at the egress node, if a telemetry difference exceeds a telemetry parameter threshold and if the telemetry difference does not exceed the telemetry parameter threshold, the telemetry difference comprising a difference between the telemetry parameter and the previous telemetry parameter;
    transmitting telemetry data of the telemetry packet to a network controller if the telemetry difference exceeds the telemetry parameter threshold; and
    dropping the telemetry data of the telemetry packet without transmission to the network controller if the telemetry difference does not exceed the telemetry parameter threshold.

2. The method of claim 1, further comprising:
    in response to the telemetry difference being less than the telemetry parameter threshold, determining an expiration status of a telemetry change timer; and
    decreasing the telemetry parameter threshold in response to determining that the telemetry change timer has expired.

3. The method of claim 1, further comprising:
    determining a telemetry data transmittal rate of telemetry packets transmitted to the network controller; and
    increasing the telemetry parameter threshold in response to determining that the telemetry data transmittal rate exceeding a transmittal rate threshold.

4. The method of claim 3, wherein the telemetry data transmittal rate comprises a number of telemetry packets transmitted to the network controller compared with a number of telemetry packets dropped and/or a number of telemetry packets received at the egress node over a period of time.

5. The method of claim 1, further comprising:
    determining an expiration status of a periodic telemetry timer; and
    transmitting telemetry data from the telemetry packet to the network controller in response to determining that the periodic telemetry timer has expired.

6. The method of claim 1, further comprising:
    calculating an end-to-end telemetry parameter from telemetry parameters of a same type for each node in the data pathway;
    comparing the end-to-end telemetry parameter with an end-to-end telemetry threshold; and
    transmitting telemetry data from the telemetry packet to the network controller in response to the end-to-end telemetry parameter exceeding the end-to-end telemetry threshold.

7. The method of claim 6, wherein the end-to-end telemetry parameter comprises end-to-end latency for the data pathway and the end-to-end telemetry threshold comprises an end-to-end latency threshold for the data pathway.

8. The method of claim 1, further comprising:
    tracking telemetry data for one or more data pathways, the telemetry data comprising telemetry parameters of individual nodes of the one or more data pathways, end-to-end telemetry parameters, a telemetry data transmittal rate to the network controller, and/or a number of dropped telemetry packets;
    using a machine learning algorithm to determine one or more trends associated with the telemetry data; and
    adjusting the telemetry parameter threshold and/or an end-to-end telemetry parameter threshold based on one or more of the trends determined by the machine learning algorithm.

9. The method of claim 1, wherein the telemetry parameter comprises hop latency, queue occupancy, number of data packets transmitted by a node per second, and/or buffer occupancy.

10. An apparatus comprising:
a processor; and
a memory storing code, the code being executable by the processor to perform operations comprising:
receiving a telemetry packet at an egress node of a data pathway in a data network, the data pathway comprising an ingress node, one or more transit nodes and the egress node, the telemetry packet comprising a telemetry parameter, the telemetry parameter for a node in the data pathway;
comparing, at the egress node, the telemetry parameter with a previous telemetry parameter from a previous telemetry packet transmitted previously on the same data pathway and received at the egress node prior to receiving the telemetry packet;
determining, at the egress node, if a telemetry difference exceeds a telemetry parameter threshold and if the telemetry difference does not exceed the telemetry parameter threshold, the telemetry difference comprising a difference between the telemetry parameter and the previous telemetry parameter;
transmitting telemetry data of the telemetry packet to a network controller if the telemetry difference exceeds the telemetry parameter threshold; and
dropping the telemetry data of the telemetry packet without transmission to the network controller if the telemetry difference does not exceed the telemetry parameter threshold.

11. The apparatus of claim 10, the operations further comprising:
in response to the telemetry difference being less than the telemetry parameter threshold, determining an expiration status of a telemetry change timer; and
decreasing the telemetry parameter threshold in response to determining that the telemetry change timer has expired.

12. The apparatus of claim 10, the operations further comprising:
determining a telemetry data transmittal rate of telemetry packets transmitted to the network controller; and
increasing the telemetry parameter threshold in response to determining that the telemetry data transmittal rate exceeding a transmittal rate threshold.

13. The apparatus of claim 10, the operations further comprising:
determining an expiration status of a periodic telemetry timer; and
transmitting telemetry data from the telemetry packet to the network controller in response to determining that the periodic telemetry timer has expired.

14. The apparatus of claim 10, the operations further comprising:
calculating an end-to-end telemetry parameter from telemetry parameters of a same type for each node in the data pathway;
comparing the end-to-end telemetry parameter with an end-to-end telemetry threshold; and
transmitting telemetry data from the telemetry packet to the network controller in response to the end-to-end telemetry parameter exceeding the end-to-end telemetry threshold.

15. The apparatus of claim 10, the operations further comprising:
tracking telemetry data for one or more data pathways, the telemetry data comprising telemetry parameters of individual nodes of the one or more data pathways, end-to-end telemetry parameters, a telemetry data transmittal rate to the network controller, and/or a number of dropped telemetry packets;
using a machine learning algorithm to determine one or more trends associated with the telemetry data; and
adjusting the telemetry parameter threshold and/or an end-to-end telemetry parameter threshold based on one or more of the trends associated determined by the machine learning algorithm.

16. A non-volatile computer readable storage medium storing code, the code being configured to be executable by a processor to perform operations comprising:
receiving a telemetry packet at an egress node of a data pathway in a data network, the data pathway comprising an ingress node, one or more transit nodes and the egress node, the telemetry packet comprising a telemetry parameter, the telemetry parameter for a node in the data pathway;
comparing, at the egress node, the telemetry parameter with a previous telemetry parameter from a previous telemetry packet transmitted previously on the same data pathway and received at the egress node prior to receiving the telemetry packet;
determining, at the egress node, if a telemetry difference exceeds a telemetry parameter threshold and if the telemetry difference does not exceed the telemetry parameter threshold, the telemetry difference comprising a difference between the telemetry parameter and the previous telemetry parameter;
transmitting telemetry data of the telemetry packet to a network controller if the telemetry difference the telemetry parameter threshold; and
dropping the telemetry data of the telemetry packet without transmission to the network controller if the telemetry difference does not exceed the telemetry parameter threshold.

17. The computer readable storage medium of claim 16, the code further comprising:
calculating an end-to-end telemetry parameter from telemetry parameters of a same type for each node in the data pathway;
comparing the end-to-end telemetry parameter with an end-to-end telemetry threshold; and
transmitting telemetry data from the telemetry packet to the network controller in response to the end-to-end telemetry parameter exceeding the end-to-end telemetry threshold.

* * * * *